United States Patent
Kwon

(10) Patent No.: US 6,385,385 B1
(45) Date of Patent: *May 7, 2002

(54) TIME LAPSE RECORDING APPARATUS FOR DIGITAL VCR AND METHOD THEREOF

(75) Inventor: Young-Gi Kwon, Yongin (KR)

(73) Assignee: Samsung Electronics Co., Ltd., Kyungki-Do (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,338

(22) Filed: Dec. 24, 1998

(30) Foreign Application Priority Data

Dec. 24, 1997 (KR) .............................. 97-73821

(51) Int. Cl.⁷ ................................................ H04N 5/76
(52) U.S. Cl. .......................................... 386/67; 386/68
(58) Field of Search ............................. 386/46, 67, 68, 386/69, 79, 61, 78, 107, 117, 80, 81; 358/906; H04N 5/76

(56) References Cited

U.S. PATENT DOCUMENTS

| | | | | |
|---|---|---|---|---|
| 3,663,766 A | * | 5/1972 | Goto | ............................ 386/78 |
| 4,796,104 A | * | 1/1989 | Ito et al. | ........................ 386/46 |
| 4,805,042 A | * | 2/1989 | Nishikata | ...................... 386/61 |
| 5,930,447 A | * | 7/1999 | Shintani | ....................... 386/80 |
| 5,999,690 A | * | 12/1999 | Ro | ............................... 386/46 |

\* cited by examiner

Primary Examiner—Huy Nguyen
(74) Attorney, Agent, or Firm—Sughrue Mion, PLLC

(57) ABSTRACT

A time lapse recording apparatus for a DVCR and a method thereof are disclosed. The apparatus includes a camera installed at a predetermined position for picturing an object and outputting a pictured data, a signal processor for processing an analog signal from the camera and converting the same into a digital signal, a field memory for writing one field data inputted from the signal processor in accordance with a writing signal and reading the field data in accordance with a reading signal, a deck in which a magnetic recording medium is seated, and a capstan motor is selectively normally and reversely rotated in accordance with a writing signal for thereby recording one field data read from the field memory onto the magnetic recording medium, and a controller outputting a writing or reading signal for writing the data into the field memory or outputting the thusly written data and controlling the capstan motor to normally or reversely rotate for a set normal rotation time and reverse rotation time, for thereby restarting a recording operation from the last recorded position in an earlier recording procedure by controlling a normal or reverse rotation of a capstan motor in a time lapse method directed to intermittently recording on a magnetic recording medium installed in a deck of a DVCR.

8 Claims, 2 Drawing Sheets

TIME LAPSE RECORDING APPARATUS FOR DIGITAL VCR AND METHOD THEREOF

BACKGROUND OF THE INVENTION

1. Field of the Invention

The present invention relates to a time lapse recording apparatus for a digital VCR(Video Cassette Tape Recorder: DVCR)) and a method thereof, and in particular to an improved time lapse recording apparatus for a digital VCR and a method thereof which are capable of restarting a recording operation from the last recorded position in an earlier recording procedure by controlling a normal or reverse rotation of a capstan motor in a time lapse method directed to intermittently recording on a magnetic recording medium installed in a deck of a DVCR(Digital Video Cassette Tape Recorder).

2. Description of the Conventional Art

Generally, since it is difficult for people to check any incident at the bank or other buildings, a plurality of closed circuit cameras are installed for recording all movements in the bank or other buildings.

In addition, the surrounding environments at the bank or other buildings are pictured using the closed circuit cameras in real time and then are recorded on a magnetic recording medium.

If necessary, the thusly recorded data is reproduced using a magnetic recording and reproducing instrument for thereby checking whether or not there is any incident.

Generally, when using a two-hour magnetic recording medium, a user should inconveniently change the magnetic recording medium with a new one every two hours.

When reproducing the recorded data for checking any incident using the record completed magnetic recording medium, the amount of the recorded data is too large to reproduce and check the same.

In order to overcome the above-described problems, the time lapse method which is an intermittent recording method is used for recording the data inputted from the cameras onto the magnetic recording medium.

FIG. 1 is a block diagram illustrating the construction of a time lapse recording apparatus for a conventional DVCR (Digital Video Cassette Tape Recorder).

A camera 1 is installed at a predetermined position for picturing an object and outputting picture data.

A signal processor 2 processes an analog signal inputted from the camera 1 into a digital signal.

A field memory 3 records data of one field signal from the processor 2 in accordance with a writing signal and outputs the field data in accordance with a reading signal from a controller 5.

In a deck 4 in which a magnetic recording medium is seated, a capstan motor is normally rotated in accordance with a writing signal from the controller 5 for thereby recording data of one field read from the field memory 3 onto a magnetic recording medium, and the capstan motor is controlled to be stopped in accordance with a stop signal from the controller.

The controller 5 outputs a writing or reading signal for recording data into the field memory 3 or reading data from the same and controls the capstan motor to normally and reversely rotate in accordance with a normal rotation time and stop time of the capstan motor.

The time lapse recording method of the DVCR will be explained with reference to FIG. 2.

FIG. 2 is a view illustrating an operation of a capstan motor for explaining the time lapse recording method for the conventional DVCR.

As shown therein, a normal rotation time and stop time of the capstan motor is set in the controller 5. The pictured data inputted from the camera 1 is converted into a digital signal by the signal processor 2, and the data corresponding to one field is stored into the field memory 3 in accordance with a writing signal of the controller 5.

At this time, the controller 5 performs the following operations for reading the data stored in the field memory 3 and recording onto a magnetic recording medium based on the time lapse method.

First, in order to read a data corresponding to one field among the data stored in the field memory 3, the controller 5 outputs a reading signal to the field memory 3 and the data with respect to one field stored in the field memory 3 is read in accordance with a reading signal from the controller 5.

In order to record the read data into the magnetic recording medium using a recording head installed at the deck 4, the capstan motor installed in the deck 4 is controlled to normally rotate for thereby moving the magnetic recording medium in the normal direction, and the data read from the field memory 3 is recorded onto the thusly moved magnetic recording medium.

As described above, after data of one field is recorded onto the magnetic recording medium, the controller 5 outputs a control signal for stopping the capstan motor. The capstan motor installed in the deck 4 is stopped by a stop control signal, and the recording head also stops a recording operation.

During the stop of the capstan motor, when the controller 5 outputs a capstan motor driving signal for recording the data of a second field data onto the magnetic recording medium, the capstan motor normally rotates for recording the data, and the magnetic recording medium is controlled to move in the normal direction.

However, in the time lapse recording method for the DVCR, since the reproducing angle for reproducing the data recorded on the magnetic recording medium is smaller than the recording angle, the data may be lost or the upper portion of the screen is skewed in the reproducing mode. there may occur In addition, the original color may not be properly reproduced at a predetermined interval of the magnetic tape medium. Furthermore, there is a problem in synchronizing the speeds of a drum and the capstan motor.

SUMMARY OF THE INVENTION

Accordingly, it is an object of the present invention to provide a time lapse recording apparatus for a DVCR and a method thereof which make it possible to restart a recording operation from the last recorded position in an earlier recording procedure by controlling a normal or reverse rotation of a capstan motor in a time lapse method directed to intermittently recording on a magnetic recording medium installed in a deck of a DVCR.

In order to achieve the above objects, there is provided a time lapse recording apparatus for a DVCR which includes a camera installed at a predetermined position for picturing an object and outputting a pictured data, a signal processor for processing an analog signal from the camera and converting the same into a digital signal, a field memory for writing data of one field inputted from the signal processor in accordance with a writing signal and reading the field data in accordance with a reading signal, a deck in which a magnetic recording medium is seated, and a capstan motor is selectively normally and reversely rotated in accordance with a writing signal for thereby recording one field data read from the field memory onto the magnetic recording medium, and a controller outputting a writing or reading signal for writing the data into the field memory or outputting the thusly written data and controlling the capstan motor to normally or reversely rotate for a set normal rotation time and reverse rotation time.

In order to achieve the above objects, there is provided a time lapse recording method for a DVCR which includes the steps of recording a data of N-field read from a field memory onto a predetermined region of a magnetic recording medium by normally rotating a capstan motor, moving the magnetic recording medium in the reverse direction by reversely rotating the capstan motor for a predetermined time after the recording step is performed, and reproducing by normally rotating the capstan motor, detecting the last data of the N-field, and recording the data of a N+1 field read from the field memory into the region next to the position in which the last data are detected.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiments of the present invention will be explained with reference to the accompanying drawings.

Figure 1:
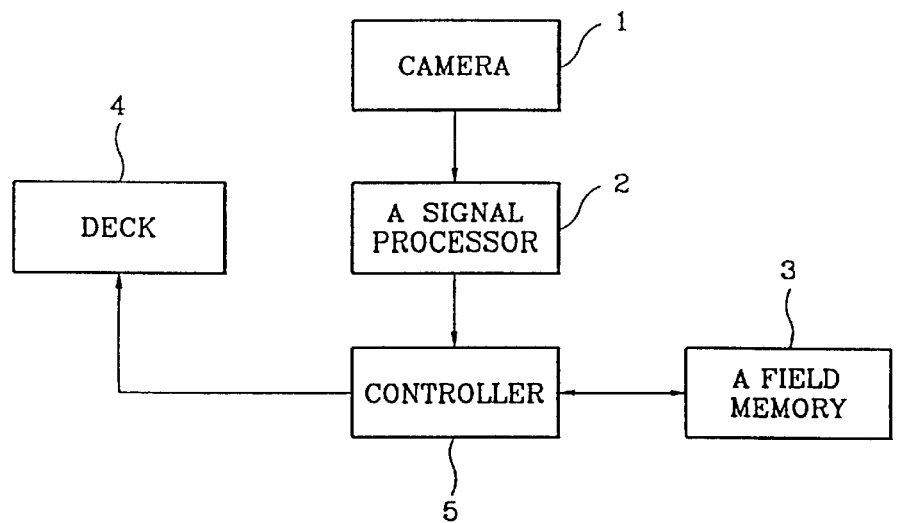
FIG. 1 is a block diagram illustrating the construction of a time lapse recording apparatus for a conventional DVCR (Digital Video Cassette Tape Recorder)
Figure 2:
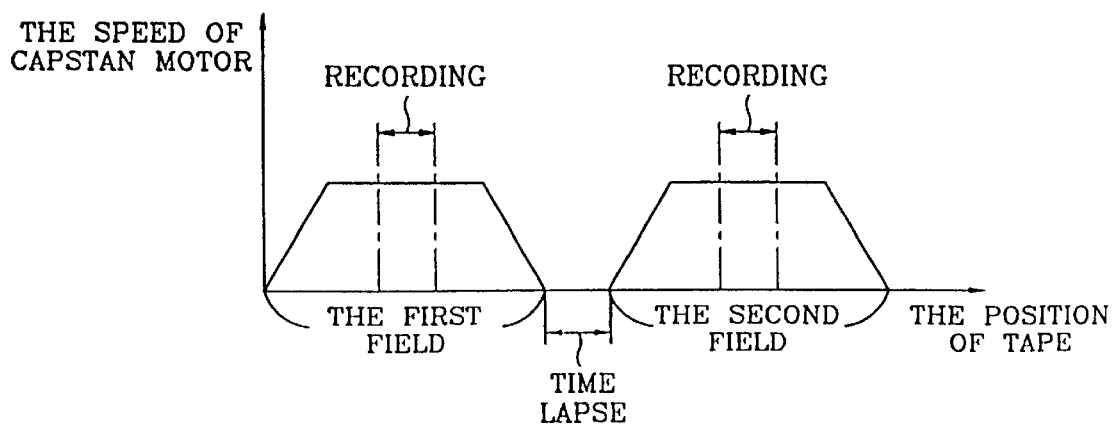
FIG. 2 is a view illustrating an operation of a capstan motor for explaining a time lapse recording method for a conventional DVCR.
Figure 3:
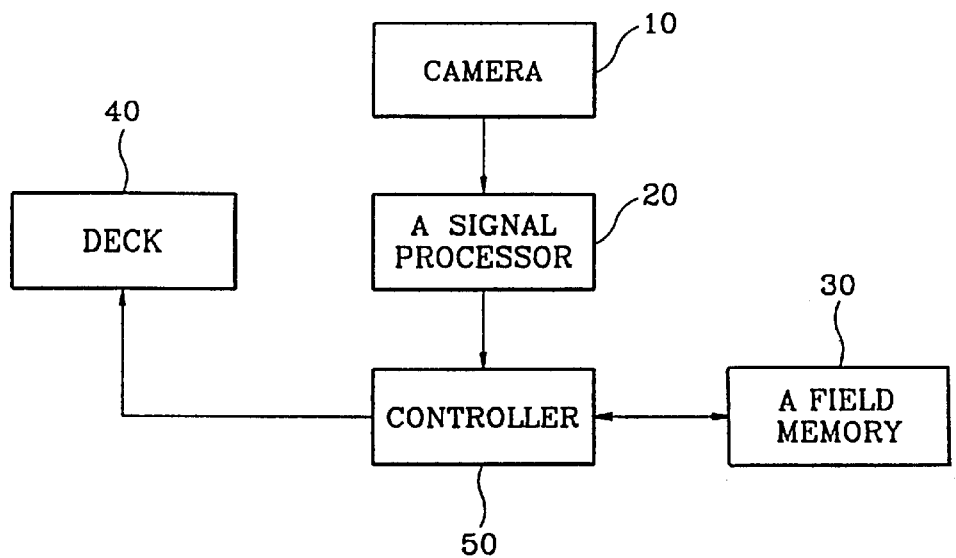
FIG. 3 is a block diagram illustrating the construction of a time lapse recording apparatus for a DVCR according to the present invention.

FIG. 3 illustrates the construction of a time lapse recording apparatus for a DVCR according to the present invention.

As shown therein, a camera 10 is installed, at a predetermined position to take a picture of an object and output picture.

A signal processor 20 converts an analog signal inputted from the camera 10 into a digital signal.

A field memory 30 writes one field data inputted from the signal processor 20 in accordance with a writing signal from a controller 50 and outputs data of one field in accordance with a reading signal from the controller 50.

In a deck 40, a magnetic recording medium is seated therein, and a capstan motor is controlled to normally or reversely rotate in accordance with a writing signal from the controller 50 for thereby recording the field data read from the field memory 30 onto a magnetic recording medium.

The controller 50 outputs a writing signal or reading signal for writing data into the field memory or outputting the data therefrom and controls the capstan motor to normally or reversely rotate in accordance with a set normal rotation time and reverse rotation time.

The operation of the time lapse recording apparatus for a DVCR according to the present invention will be explained with reference to FIG. 4.

Figure 4:
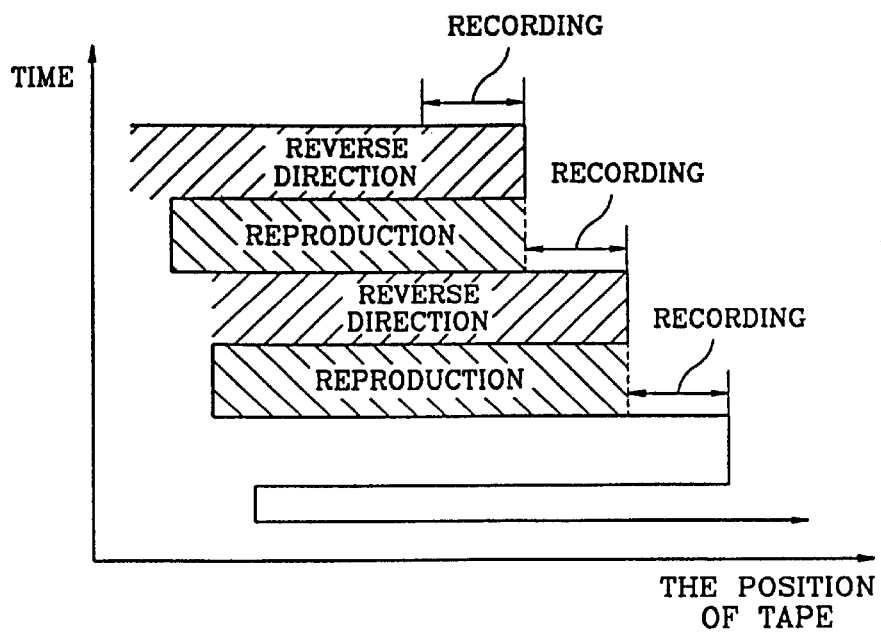
FIG. 4 is a view illustrating an operation of a capstan motor for explaining a time lapse recording method for a DVCR according to the present invention.

FIG. 4 illustrates an operation of a capstan motor for explaining a time lapse recording method for a DVCR according to the present invention.

Generally, since the operation for processing the pictured data inputted from the camera 10 is the same as the conventional art, the description thereof will be omitted except for the following inventive features of the present invention. First, the operation that the controller 50 controls an operation that the data inputted from the camera 10 is recorded onto a magnetic recording medium based on the time lapse method will be explained. The capstan motor installed in the deck 40 is normally rotated, and one field data read from the field memory 30 is recorded into a predetermined region of the magnetic recording medium through a recording head installed in the deck 40.

After the data are recorded into a predetermined region of the magnetic recording medium, the controller 50 controls the capstan motor to reversely rotate for a predetermined time, and then the magnetic recording medium is moved in a predetermined direction.

Thereafter, the capstan motor is controlled to normally rotate, and the data recorded on the magnetic recording medium is reproduced. If the thusly reproduced data is the last data of the first field, the data of the second field read from the field memory 30 is recorded into the region next to the position in which the last data are detected.

At this time, the above-described reproducing operation is not performed for a user to actually view the reproducing data.

Namely, the controller 50 just detects the recording start region of the magnetic recording medium for recording the next field data.

Therefore, when the data of the field memory is recorded onto the magnetic recording medium based on the time lapse method, in the conventional art, after the data are recorded into the magnetic recording medium, the capstan motor is stopped for a predetermined time, and when another data is recorded, the capstan motor is controlled to normally rotate. However, in the present invention, after the data are recorded on the magnetic recording medium, the capstan motor is controlled to reversely rotate for a predetermined time, and then to normally rotate, so that the data of the next field is recorded for thereby preventing a degradation of the picture when repeatedly recording the data onto the magnetic recording medium and preventing a data loss because the recording angle and reproducing angle are the same. In addition, it is possible to use a DVCR by selectively setting the time lapse mode.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A recording apparatus comprising:
   a signal processor for processing an analog signal and converting the processed analog signal into a digital signal;
   a field memory for writing data of one field input from the signal processor in accordance with a writing signal and reading the data in accordance with a reading signal;
   a deck in which a magnetic recording medium is disposed, and in which a capstan motor is selectively normally and reversely rotated in accordance with a writing signal for thereby recording the data of one field read from the field memory onto the magnetic recording medium; and
   a controller for outputting the writing signal for writing the data into the field memory and the reading signal for outputting the thusly written data and for controlling the capstan motor to normally rotate for a set normal rotation time and to reversely rotate for a set reverse rotation time.

2. The apparatus of claim 1, wherein said reverse rotation time of the capstan motor is a time moveable to a minimum position having a data recorded on the magnetic recording medium.

3. The apparatus of claim 1, wherein the controller controls the capstan motor to reversely rotate for the set reverse rotation time in response to recording the data read from the field memory and in response to completion of the reverse rotation controls the capstan motor to normally rotate for the set normal rotation time.

4. The apparatus of claim 3, wherein upon completion of the normal rotation the magnetic recording medium is positioned the controller controls the capstan motor to reversely rotate for the set reverse rotation time in response to recording the data read from the field memory and in response to completion of the reverse rotation controls the capstan motor to normally rotate for the set normal rotation time; and
   wherein the deck reproduces data recorded on the magnetic recording medium when the capstan motor normally rotates for the set normal rotation time.

5. The apparatus of claim 4, wherein the data reproduced when the capstan motor rotates for the set normal rotation time is not displayed for a user.

6. The apparatus of claim 1, wherein the recording apparatus is a time lapse recording apparatus.

7. The apparatus of claim 1, wherein the recording apparatus is a digital video cassette tape recorder (DVCR).

8. The apparatus of claim 1, further comprising a camera installed at a predetermined location for generating pictures of an object and outputting picture data, wherein the digital signal is a digital representation of the output picture data.

* * * * *